UNITED STATES PATENT OFFICE.

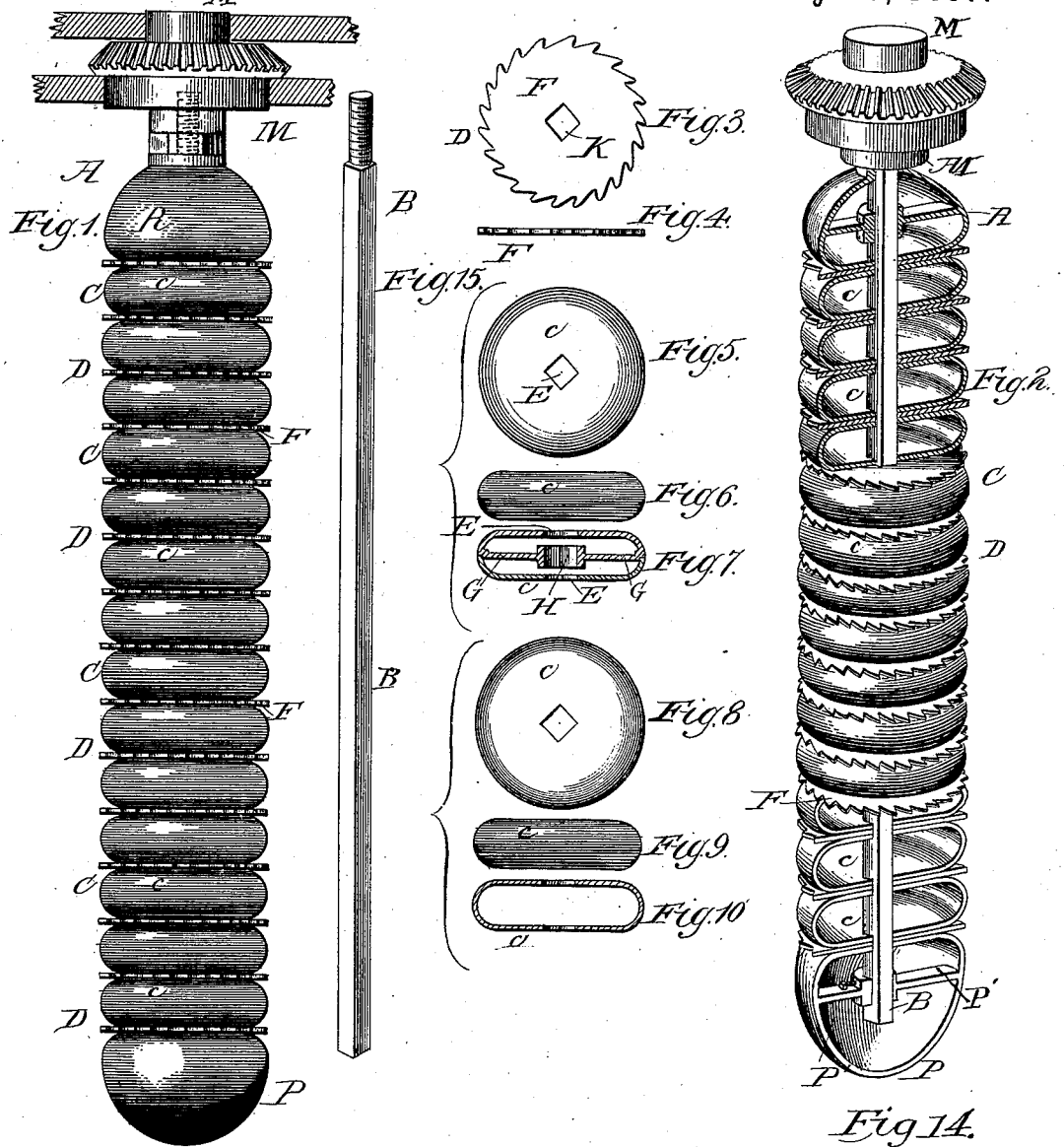

GEORGE N. TODD, OF NEW YORK, N. Y., ASSIGNOR TO THE TODD COTTON HARVESTER COMPANY, OF ILLINOIS.

COTTON-HARVESTER.

SPECIFICATION forming part of Letters Patent No. 367,075, dated July 26, 1887.

Application filed September 25, 1884. Serial No. 143,954. (No model.)

*To all whom it may concern:*

Be it known that I, GEORGE N. TODD, a citizen of the United States, residing in New York, county of New York, and State of New York, have invented certain new and useful Improvements in Picker-Stems for Cotton-Harvesters, of which the following is a specification.

This invention relates to an improvement in picker-stems for cotton-harvesters of that class in which the stem has been constructed with circular lines of saw-shaped picking-teeth alternating with guards rising substantially to a level with the outer ends of the teeth. Heretofore a picker-stem of such character has been constructed by fitting on a spindle a series of toothed disks, so as to provide for an arrangement of picker-teeth, and also fitting on the same spindle a series of solid wooden hubs or disks, alternating with the toothed disks and provided with annular offsets, so as to form annular spaces along the stem.

The object of my invention is to provide a lighter and at the same time a stronger construction of picker stem; and to such end I form the guards of shells or hollow cast-metal buttons, which can be slipped and held on a shaft or spindle in conjunction with the toothed disks.

A further object is to provide annular approximately V-shaped grooves between the buttons or guards, so as to afford spaces for the teeth and to admit of the teeth being set in the middle of the space, in place of at one side thereof; and to such end I form the buttons with rounded edges, whereby, when fitted on the spindle in conjunction with the toothed disks, the teeth on a disk shall lie in a space between said rounded edges of the buttons and in the middle of the space; also, to provide a picker-stem with a series of annular rounded guards alternating with circular lines of picker-teeth, whereby the stem can be readily thrust into and drawn out from the plants without injury to the latter, and also the branches be more effectively kept from the teeth by reason of the rounded guards, which readily slip along and by the branches.

I attain these objects by devices illustrated in the accompanying drawings, in which—

Figure 1 represents a picker-stem constructed in accordance with my invention. Fig. 2 is a perspective view of the same, partly in section. Fig. 3 is a side and Fig. 4 an edge view of one of the toothed disks. Fig. 5 is a side view, Fig. 6 an edge view, and Fig. 7 a transverse section, of one of the shells or hollow buttons made in two parts. Fig. 8 is a side view, Fig. 9 an edge view, and Fig. 10 a transverse central section, of one of the buttons made in one piece. Fig. 11 shows a spherical button or shell, and Fig. 12 is a section through the same. Fig. 13 represents one of the toothed disks made in the shape of a flat toothed ring. Fig. 14 shows the picker-stem shaft and button-hub in section and a set-screw for holding the parts together, and Fig. 15 the picker-stem shaft detached.

The rotary picker-stem A is composed of a series of sections arranged upon a shaft, spindle, or axle, B, and adapted to form guards C, and circular lines of picker-teeth D, alternating with each other substantially from end to end of the picker-stem. The body of the picker-stem A is mainly composed of a series of shells or hollow buttons, c, which are each provided with a rounded periphery or edge and a central opening or passage, E, so that the said shells or buttons can be strung on axle B, so as to practically form a stem composed of a light hollow body having a series of annular rounded ribs, constituting guards for preventing the branches of the plants from being engaged by the picker-teeth which lie in the middle or annular approximately V-shaped grooves formed between the rounded guards which are thus formed by the shells or buttons. These shells or buttons could be each made of two parts, soldered or otherwise secured together, although the preferred mode of making them will be to cast each shell or button in one piece and of any suitable metal.

Figs. 5 to 15, both inclusive, illustrate several of the many ways in which the shells or buttons can be made. Thus, for example, in Figs. 5, 6, and 7 I have shown a flattened shell or button formed with a rounded periphery and provided at each side with a rectangular opening, E, for the squared axle of the picker-stem. This button is shown made of halves, as in Fig. 7, and comprises, also, a central partition, G, having a middle hub, H, adapted to fit on the axle of the picker-stem. This central partition lends strength to the two-part shell or button and can be made integral with one of the halves thereof, so that one half will be in the nature of a plano-convex portion and the other a concavo-convex cap or half, fitting at its edge on an annular seat in the plano-convex half. These halves can be soldered or otherwise suitably secured together. In place of forming the shell or button of two parts, it is cast in one piece and the central hub and partition dispensed with.

Figs. 11 and 12 illustrate a spherical shell or button provided with diametrically-opposite openings E, which are surrounded by necks I, projecting within the shell or button.

The toothed disk in Figs. 3 and 4 resembles a circular saw, composed of a disk provided with a squared central opening, K, for receiving the axle, and having its periphery notched, so as to form a circular set of saw-shaped picker-teeth; but in lieu of this construction of disk it can be formed of a flat annular ring, L, provided with saw-shaped picker-teeth along its periphery, and adapted to be soldered or otherwise secured to and between two opposing shells or buttons.

The shells or buttons and the toothed disks are fitted on the central common axle with the toothed disks alternating with the buttons, so that one toothed disk shall come between, rising substantially to a level with the extreme peripheral portions of the guards.

As the toothed disks and the buttons have square or angular central openings, they will retain their place thereon, and the entire series can be tightened up by a nut at one end of the shaft; or they can be secured together by solder, bolts, or rivets, as may be preferred.

The toothed rings—such as shown in Fig. 13—can be soldered or riveted to the side of one or to the opposing-sides of a pair of shells or buttons, as may be desired; but for some reasons the toothed disk having a central opening conforming to the axle will be the preferred construction, since, for example, the buttons and toothed disks being made of proper relative size, no skill will be required in putting the same together so as to bring the ends of the teeth in proper relative position to the highest line or face portions of the guards.

The axle B is formed with or secured in a short enlarged axle, M, provided with a bevel-gear and working in a couple of bearings, as set forth in another application which I have made for Letters Patent, filed September 25, 1884, Serial No. 143,952.

The entering end or point P of the stem is composed of a shell fitted on an end of the axle B and formed with a central strengthening-partition, P', having a hub, in which an end of the axle is fitted, if so desired. This shell will be of an approximately hemispherical shape, or it may be made somewhat of a conoidal configuration, either shape serving to well adapt it for entering the plants without catching or injuring the same. This shell, constituting the entering end of the picker stem, will be fitted on the axle, and can be secured to the next shell or button or toothed disk by solder or otherwise, as will be readily understood. The shell R at the inner end of the picker-stem can also be made of a like configuration with the outer end shell, the axle B in this instance, however, passing entirely through the shell.

Having described my invention, what I claim, and desire to secure by Letters Patent, is—

1. A picker-stem for a cotton-harvester, composed of a series of independent hollow sections fitted on a spindle and forming circular guards, and a series of circular lines of picker teeth alternating with the said guards, substantially as described.

2. A picker-stem composed of a set of shells or hollow buttons and a set of toothed disks alternating with the shells, said shells forming guards at the sides of the picker-teeth, substantially as described.

3. A picker-stem comprising a central shaft, a set of guards consisting of shells or hollow buttons formed with rounded edges and fitted upon said shaft, and circular lines of picker-teeth alternating with the said guards, substantially as described.

4. A picker-stem composed of a central shaft, a series of guards formed of a series of shells or hollow buttons, and toothed disks alternating with the shells or buttons, said members being rigidly secured upon said shaft, substantially as described.

5. The picker-stem composed of a central shaft, shells or hollow buttons, and toothed disks, as described, and having its front formed of a shell fitted on said shaft, substantially as described.

6. In a picker-stem for a cotton-harvester, the guards composed of shells or hollow buttons fitted upon an axle, substantially as described.

7. In a picker-stem for a cotton-harvester, the guards composed of hollow buttons provided with central partitions, substantially as described.

8. In a picker-stem for a cotton-harvester, in combination with the central shaft, the guards each composed of a hollow button having a central opening on each side and a central partition provided with a hub, substantially as described.

GEORGE N. TODD.

Witnesses:
W. W. ELLIOTT,
JNO. G. ELLIOTT.